(12) United States Patent
Jiang

(10) Patent No.: US 12,078,327 B2
(45) Date of Patent: Sep. 3, 2024

(54) STAGE LIGHT FIXTURE WITH HIGH-ACCURACY ROTARY POSITIONING

(71) Applicant: Guangzhou Haoyang Electronic Co., Ltd., Guangdong (CN)

(72) Inventor: Weikai Jiang, Guangdong (CN)

(73) Assignee: GUANGZHOU HAOYANG ELECTRONIC CO., LTD., Guangdong (CN)

( * ) Notice: Subject to any disclaimer, the term of this patent is extended or adjusted under 35 U.S.C. 154(b) by 222 days.

(21) Appl. No.: 17/589,288

(22) Filed: Jan. 31, 2022

(65) Prior Publication Data
US 2022/0205621 A1 Jun. 30, 2022

Related U.S. Application Data

(63) Continuation of application No. PCT/CN2021/109545, filed on Jul. 30, 2021.

(30) Foreign Application Priority Data

Dec. 28, 2020 (CN) .......................... 202011579109.7

(51) Int. Cl.
*F21V 21/15* (2006.01)
*H02K 7/08* (2006.01)
(Continued)

(52) U.S. Cl.
CPC ............. *F21V 21/15* (2013.01); *H02K 7/083* (2013.01); *H02K 21/22* (2013.01); *F21W 2131/406* (2013.01)

(58) Field of Classification Search
CPC ........ F21V 21/15; H02K 7/083; H02K 21/22; F21W 2131/406
(Continued)

(56) References Cited

U.S. PATENT DOCUMENTS

| 2004/0028300 | A1 | 2/2004 | Gomyo et al. | |
|---|---|---|---|---|
| 2005/0174791 | A1* | 8/2005 | Bynum | B60Q 3/82 362/490 |
| 2011/0222301 | A1* | 9/2011 | Knoedgen | B60Q 1/122 362/277 |

FOREIGN PATENT DOCUMENTS

| CN | 1461091 A | 12/2003 |
|---|---|---|
| CN | 201050733 Y | 4/2008 |

(Continued)

*Primary Examiner* — Andrew J Coughlin
*Assistant Examiner* — Hana S Featherly
(74) *Attorney, Agent, or Firm* — MUNCY, GEISSLER, OLDS & LOWE, P.C.

(57) ABSTRACT

A stage light fixture with high-accuracy rotary positioning includes a supporting member and a pivoting member pivoted to the supporting member. The pivoting member has at least one light source for generating a lighting effect and is driven to rotate by at least one flat motor. The flat motor includes a stator generating a magnetic field by energization, and a rotor sleeve on the stator and driven by the magnetic field. The pivoting member is fixedly connected with the rotor, and the supporting member is fixedly connected with the stator; or the pivoting member is fixedly connected with the stator, and the supporting member is fixedly connected with the rotor. With respect to the conventional rotating shaft motor, no transmission assembly is provided, a transmission error thus can be avoided to achieve more accurate positioning, and a height of the motor can further be reduced.

11 Claims, 4 Drawing Sheets

(51) Int. Cl.
*H02K 21/22* (2006.01)
*F21W 131/406* (2006.01)

(58) Field of Classification Search
USPC .......................................................... 362/268
See application file for complete search history.

(56) References Cited

FOREIGN PATENT DOCUMENTS

| | | |
|---|---|---|
| CN | 203377713 U | 1/2014 |
| CN | 104201821 A | 12/2014 |
| CN | 106533017 A | 3/2017 |
| CN | 206894412 U | 1/2018 |
| CN | 107726237 A | 2/2018 |
| CN | 207421954 U | 5/2018 |
| CN | 109737336 A | 5/2019 |
| CN | 112594641 A | 4/2021 |
| DE | 10313997 A1 | 12/2004 |
| JP | 2004222463 A | 8/2004 |

\* cited by examiner

STAGE LIGHT FIXTURE WITH HIGH-ACCURACY ROTARY POSITIONING

CROSS REFERENCE TO RELATED APPLICATIONS

The present application is a continuation of International Application No. PCT/CN2021/109545, filed on Jul. 30, 2021, which claims priority from Chinese Patent Application No. 202011579109.7 filed on Dec. 28, 2020, all of which are hereby incorporated herein by reference.

TECHNICAL FIELD

The present invention relates to the technical field of stage light, and more particularly, relates to a stage light fixture with high-accuracy rotary positioning.

BACKGROUND

As important equipment for rendering the atmosphere, stage lights are widely used in various venues. The projection distance of the stage lights is generally 30 m-50 m in the working process, relatively high rotation driving accuracy of light heads or arms of the stage lights is thus required. A slight deviation of a rotation angle will cause large shifting of the finally projected light spots. Presently, the light heads or arms of the stage lights are usually driven by motors connecting belts, or driven by mutual meshing of gears. In such configuration, there is a gap between the belt and the gear or between the gears, and a tooth jumping may also occur between the belt and the gear, which may lead to errors in rotary positioning of the light head or arm, and cause that the light head or arm cannot be positioned to the ideal position.

SUMMARY

The present invention provides a stage light fixture with high-accuracy rotary positioning, in which a pivoting member is directly connected with a stator or a rotor of a flat motor, a transmission assembly is eliminated, so that an accuracy error in a transmission process can be avoided.

According to the present invention, the stage light fixture with high-accuracy rotary positioning includes a pivoting member and a supporting member. The pivoting member is pivoted to the supporting member and has at least one light source for generating a lighting effect. The pivoting member is driven to rotate by at least one flat motor. The flat motor includes a stator generating a magnetic field by energization, and a rotor arranged outside the stator in a sleeving mode and driven by the magnetic field. The pivoting member is fixedly connected with the rotor, the supporting member is fixedly connected with the stator; or the pivoting member is fixedly connected with the stator, and the supporting member is fixedly connected with the rotor.

In such configuration, the stage light fixture uses the alternating magnetic field on the stator to drive the rotor to rotate. In the present invention, the rotor is arranged outside the stator in the sleeving mode, an end surface area is larger than that of a rotating shaft of a conventional rotating shaft motor, so that the rotor can be fixed to the pivoting member or the supporting member more easily, and will not randomly waggle, achieving better stability. Furthermore, since the transmission assembly is eliminated, the transmission error caused by accuracy and other problems in a mechanical transmission process is avoided, so that the pivoting member is positioned more accurately, and even if projection at a long distance is performed, light spots will not shift. In addition, the stator or the rotor is directly connected with the pivoting member, the stator or the rotor can be used as a pivoting shaft of the pivoting member, there is no need to additionally arrange a space for mounting the motor, which can solve the existing problem that, due to the presence of the motor, a light base or a supporting arm needs to be designed thick. With the configuration of the rotor being arranged outside the stator in the sleeving mode, and the rotating shaft being eliminated with respect to the conventional rotating shaft motor, a height of the motor can be reduced and the motor can be conveniently installed at a spatial position with a limited height.

According to the present invention, the stator includes a stator core and a stator winding around the stator core. The rotor includes a ring body and permanent magnets arranged in the ring body. The stator produces the magnetic field with a direction changing continuously by changing a current direction of the stator winding, so that the rotor provided with the permanent magnet can be driven to rotate, a principle of which is similar with that of a common stepping motor.

According to the present invention, an end portion of the stator has an enlarged portion preventing the rotor from falling off. The rotor is limited by the stator through the enlarged portion, which avoids that the rotor slides randomly on the stator.

According to the present invention, the end portion of the stator has an end cover preventing the rotor from falling off. After the rotor is arranged outside the stator in the sleeving mode, the end cover is connected with the stator to limit the rotor, which avoids that the rotor slides randomly on the stator.

According to the present invention, the stator and the rotor are connected by at least one bearing. The bearing enables rotation of the rotor and the stator to be independent of each other, so that the rotation is smoother.

According to the present invention, an inner side of the rotor has protruding portions, there are two bearings which are respectively located at upper and lower ends of the protruding portion, and an outer ring of the bearing abuts against the protruding portion. The protruding portion can support the outer ring of the bearing. The two bearings are arranged, on one hand, a volume of the single bearing can be reduced, and on the other hand, machining errors of the two bearings can be counteracted, so that the rotor is not prone to waggle when fixed to the stator.

According to the present invention, the stator is provided with a penetrating hole along a center of rotation of the pivoting member in a penetrating mode. A cable that transmits signals and electric power between the pivoting member and the supporting member may pass through the penetrating hole to facilitate cabling.

According to the present invention, the pivoting member can be a light head of the stage light fixture, and the supporting member can be a supporting arm of the stage light fixture. That is to say, the light head is driven to rotate relative to the supporting arm by the flat motor.

According to the present invention, two sides of the pivoting member are both pivoted, and each is driven by one flat motor. The two flat motors work synchronously to drive the pivoting member to rotate, a requirement for power of each of the flat motors is low, and a volume of the flat motor can also be smaller.

According to the present invention, the pivoting member can also be a light head and a supporting arm of the stage light fixture, and the supporting member can be a light base of the stage light fixture. That is to say, the supporting arm is driven to rotate relative to the light base by the flat motor.

According to the present invention, at least one of a light beam shading component, a pattern reshaping component, a color rendering component, a focusing lens component, a light splitting component, a frosting component and a magnifying lens component is provided in the pivoting member to respectively achieve effects of shading a light beam periphery, reshaping a light beam pattern, rendering light beam color, adjusting a light beam focus, splitting a light beam, homogenizing light of the light beam and magnifying light spots.

DETAILED DESCRIPTION

The accompanying drawings are only for illustrative descriptions and cannot be understood as a limitation to the patent. In order to better illustrate the embodiment, some parts of the accompanying drawings may be omitted, enlarged or reduced, and do not represent a size of an actual product; and it is understandable for those skilled in the art that some well-known structures in the accompanying drawings and their descriptions may be omitted. The positional relationships depicted in the accompanying drawings are only for illustrative descriptions and cannot be understood as a limitation to the patent.

Figure 1:
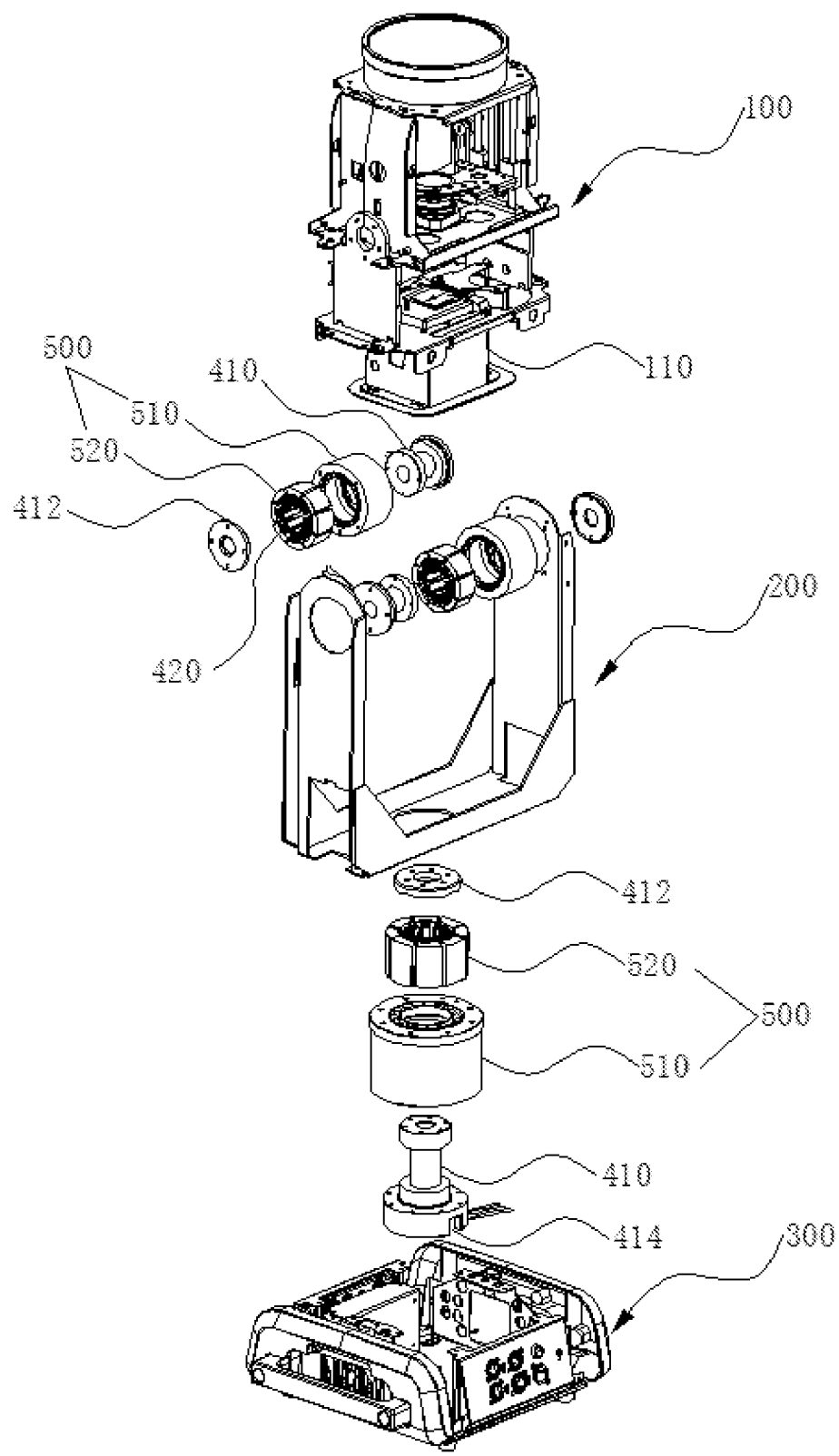
FIG. 1 is an exploded structure view of a stage light fixture with high-accuracy rotary positioning according to the present invention.
Figure 2:
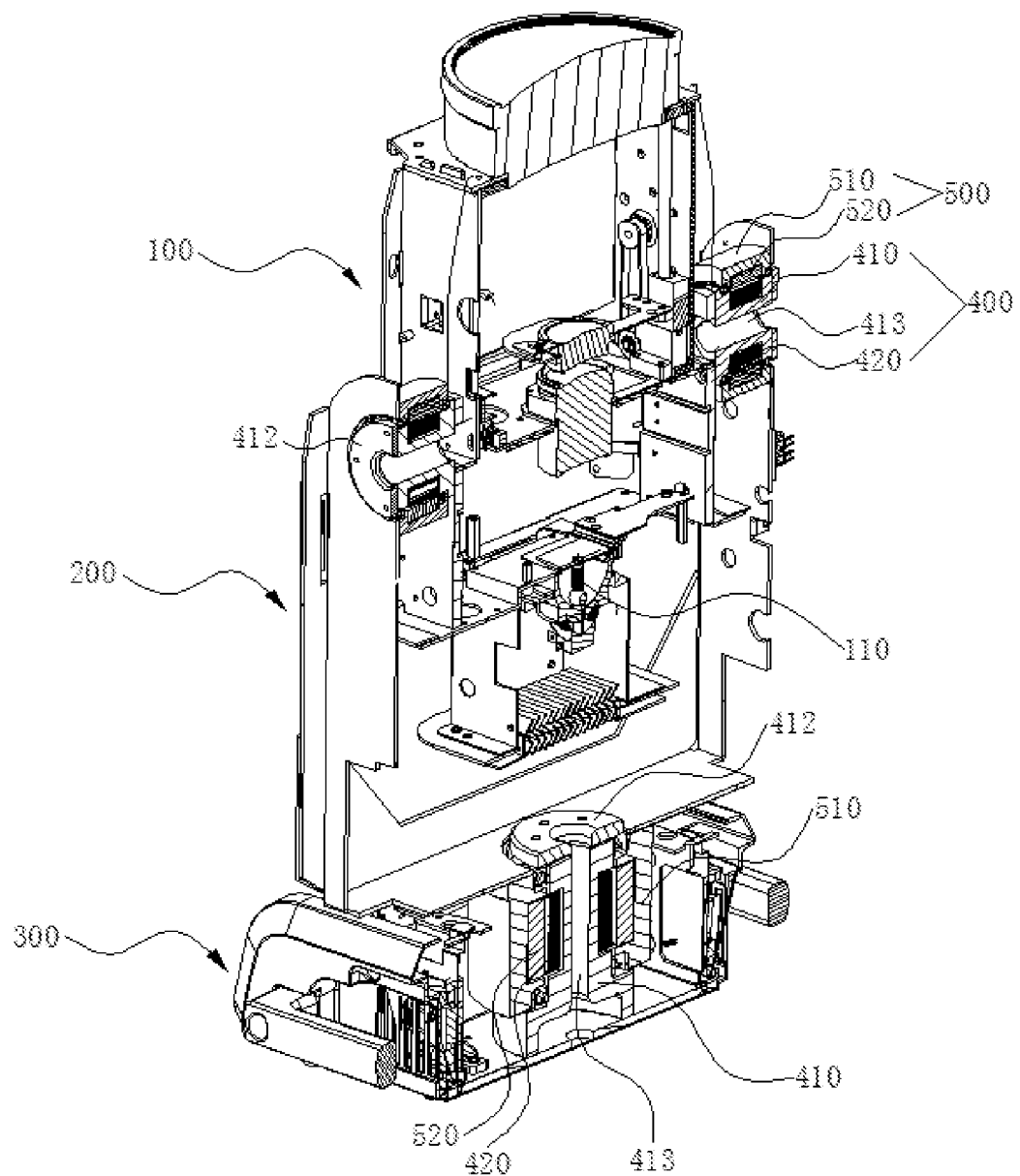
FIG. 2 is a sectional structure view of the stage light fixture according to the present invention.
Figure 3:
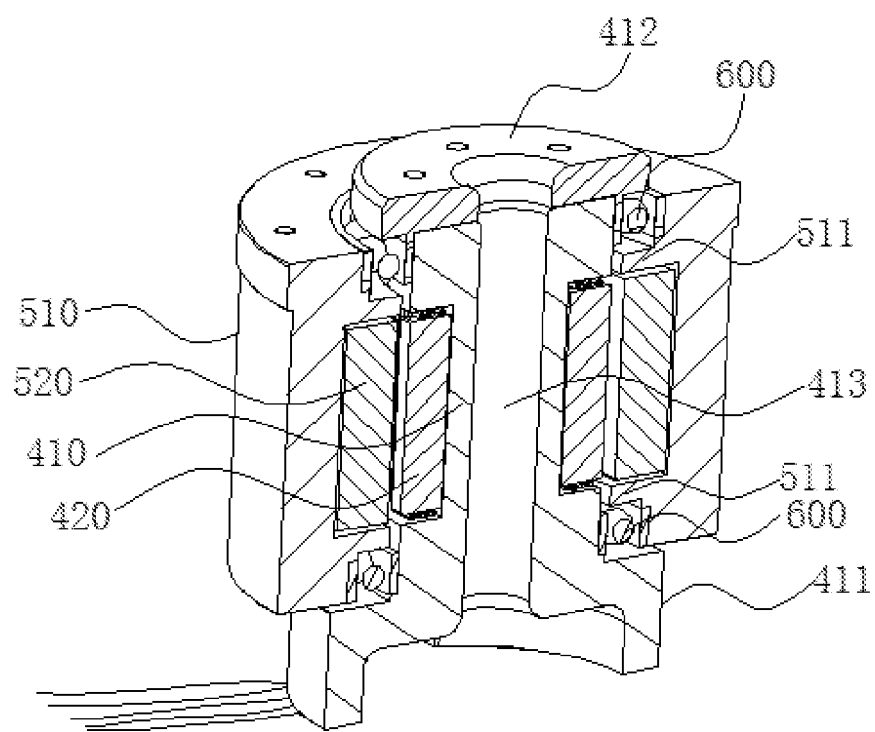
FIG. 3 is a schematic view showing a longitudinal cross-section of a flat motor of the stage light fixture according to the present invention.
Figure 4:
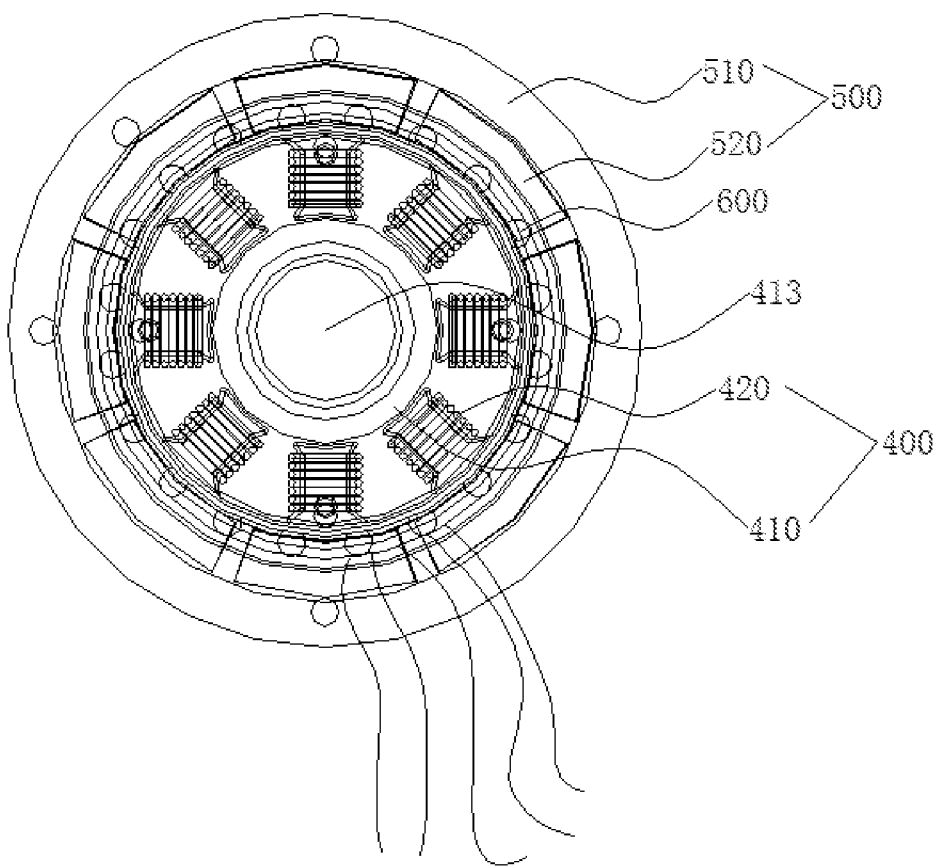
FIG. 4 is a schematic view showing a transverse cross-section of the flat motor of the stage light fixture according to the present invention.

As in FIG. 1 and FIG. 2, a stage light fixture with high-accuracy rotary positioning is provided according to an embodiment. The light fixture includes a pivoting member and a supporting member. The pivoting member is pivoted to the supporting member and has at least one light source 110 for generating a lighting effect. The pivoting member is driven to rotate by at least one flat motor. The flat motor includes a stator 400 generating a magnetic field by energization, and a rotor 500 arranged outside the stator 400 in a sleeving mode and driven by the magnetic field. The pivoting member is fixedly connected with the rotor 500, and the supporting member is fixedly connected with the stator 400; or the pivoting member is fixedly connected with the stator 400, and the supporting member is fixedly connected with the rotor 500.

The stage light fixture in the present embodiment uses the alternating magnetic field on the stator 400 to drive the rotor 500 to rotate. In such configuration, the rotor 500 is arranged outside the stator 400 in a sleeving mode, an end surface area is larger than that of a rotating shaft in a conventional rotating shaft motor, so that the rotor can be easily fixed to the pivoting member or the supporting member, thus random waggling will not cause, and better stability is achieved. Furthermore, since a transmission assembly is eliminated, a transmission error caused by accuracy and other problems in a mechanical transmission process is avoided, so that the pivoting member is positioned more accurately, and even if projection at a long distance is performed, light spots will not shift. In addition, the stator 400 or the rotor 500 is directly connected with the pivoting member, the stator 400 or the rotor 500 can be used as a pivoting shaft of the pivoting member, additional space is thus not required to mount the motor, which can solve the existing problem that, due to the presence of the motor, a light base 300 or a supporting arm 200 needs to be designed thick. With the configuration of the rotor 500 being arranged outside the stator 400 in the sleeving mode, and the rotating shaft being eliminated with respect to the conventional rotating shaft motor, a height of the motor can be reduced and the motor can be conveniently installed at a spatial position with a limited height.

When the pivoting member is fixedly connected with the stator 400 and the supporting member is fixedly connected to the rotor 500, if the rotor 500 and the supporting member are enabled to be kept relatively fixed, due to interaction of forces, the stator 400 will drive the pivoting member to rotate.

As shown in FIG. 1 to FIG. 4, according to a preferred embodiment of the present invention, the stator 400 includes a stator core 410 and a stator winding 420 around the stator core 410. The rotor 500 includes a ring body 510 and permanent magnets 520 arranged in the ring body 510. The stator 400 produces the magnetic field with a direction changing continuously by changing a current direction of the stator winding 420, so that the rotor 500 provided with the permanent magnet 520 can be driven to rotate, a principle of which is similar with that of a common stepping motor. The stator winding 420 includes a plurality of coils opposite to the permanent magnet 520, and the permanent magnet 520 is transversely arranged, opposite to polarity of the coil.

In a preferred embodiment of the present invention, an end portion of the stator 400 has an enlarged portion 411 preventing the rotor 500 from falling off. The rotor 500 is limited by the stator 400 through the enlarged portion 411, which avoids that the rotor 500 slides randomly on the stator 400.

In another preferred embodiment of the present invention, the end portion of the stator 400 has an end cover 412 preventing the rotor 500 from falling off. After the rotor 500 is arranged outside the stator 400 in the sleeving mode, the end cover 412 is connected with the stator 400 to limit the rotor 500, which avoids that the rotor 500 slides randomly on the stator 400. The enlarged portion 411 is used for fixing at the same time, and is connected with the pivoting member or the supporting member through a screw penetrating through the enlarged portion 411.

According to the embodiment, one end of the stator 400 is provided with the enlarged portion 411, and the other end of the stator 400 is provided with the end cover 412.

In a preferred embodiment of the present invention, the stator 400 and the rotor 500 are connected by at least one bearing 600. The bearing 600 enables rotation of the rotor 500 and the stator 400 to be independent of each other, so that the rotation is smoother.

According to the embodiment, two ends of an inner ring of the bearing 600 respectively abut against the enlarged portion 411 and a convex ring arranged on the rotor 500. Optionally, the convex ring is attached to the enlarged portion 411 to be arranged.

In a preferred embodiment of the present invention, an inner side of the rotor 500 has a protruding portion 511. There are two bearings 600 which are respectively located at upper and lower ends of the protruding portion 511, and an outer ring of the bearing 600 abuts against the protruding portion 511. The protruding portion 511 can support the outer ring of the bearing 600. Two bearings 600 are arranged, so that, on one hand, a volume of the single bearing 600 can be reduced, and on the other hand, machining errors of the two bearings 600 can be counteracted, the rotor 500 thus is not prone to waggle when fixed to the stator 400.

In a preferred embodiment of the present invention, the stator 400 is provided with a penetrating hole 413 along a center of rotation of the pivoting member in a penetrating mode. A cable that transmits signals and electric power between the pivoting member and the supporting member may pass through the penetrating hole 413, facilitating cabling.

In such configuration, a tail end of the enlarged portion 411 arranged on the end portion of the stator 400 and preventing the rotor 500 from falling off has a notch 414 for a wire to go out.

Optionally, the end cover 412 is provided with a through hole corresponding to the penetrating hole 413 for passing a wire.

Optionally, a side wall of one end of the through hole away from the stator 400 is arc-shaped to avoid that due to friction, the cable is damaged.

In a preferred embodiment of the present invention, the pivoting member is a light head 100 of the stage light fixture, and the supporting member is a supporting arm 200 of the stage light fixture. That is to say, the light head 100 is driven to rotate relative to the supporting arm 200 by the flat motor. In this embodiment, the pivoting member is fixedly connected with the stator 400, and the supporting member is fixedly connected with the rotor 500.

In a preferred embodiment of the present invention, two sides of the pivoting member are both pivoted, and each is driven by one flat motor. The two flat motors work synchronously to drive the pivoting member to rotate, a requirement for power of each of the flat motors is low, and a volume of the flat motor can also be smaller.

In another preferred embodiment of the present invention, the pivoting member is a light head 100 and a supporting arm 200 of the stage light fixture, and the supporting member is a light base 300 of the stage light fixture. That is to say, the supporting arm 200 is driven to rotate relative to the light base 300 by the flat motor. In this embodiment, the pivoting member is fixedly connected with the rotor 500, and the supporting member is fixedly connected with the stator 400.

In general, the light head 100 of the stage light fixture is pivoted to the supporting arm 200 to rotate around a first dimension, and the supporting arm 200 is pivoted to the light base 300 to rotate around a second dimension, which together achieve universal rotation of the light head 100.

In a preferred embodiment of the present invention, at least one of a light beam shading component, a pattern reshaping component, a color rendering component, a focusing lens component, a light splitting component, a frosting component and a magnifying lens component is in the pivoting member to respectively achieve effects of shading a light beam periphery, reshaping a light beam pattern, rendering light beam color, adjusting a light beam focus, splitting a light beam, homogenizing light of the light beam and magnifying light spots.

Obviously, the above-mentioned embodiments of the present invention are merely examples to clearly illustrate the present invention, and are not intended to limit the implementation modes of the present invention. For those of ordinary skill in the art, other changes or modifications in different forms can also be made on the basis of the above description. It is unnecessary and impossible to list all the implementation modes here. Any modification, equivalent replacement, improvement and the like made within the spirit and principle of the present invention shall be included in the protection scope of the claims of the present invention.

The invention claimed is:

1. A stage light fixture with high-accuracy rotary positioning, comprising:
   a supporting member; and
   a pivoting member pivoted to the supporting member, wherein the pivoting member has at least one light source for generating a lighting effect and is configured to be driven to rotate about the supporting member by at least one flat motor,
   wherein the at least one flat motor comprises
      a stator generating a magnetic field by energization; and
      a rotor sleeved on the stator and driven by the magnetic field, and
   wherein the pivoting member is fixedly connected with the rotor, and the supporting member is fixedly connected with the stator, or wherein the pivoting member is fixedly connected with the stator, and the supporting member being fixedly connected with the rotor.

2. The stage light fixture according to claim 1, wherein the stator comprises a stator core and a stator winding around the stator core, and the rotor comprises a ring body around the stator core and a permanent magnet arranged in the ring body and surrounded the stator winding.

3. The stage light fixture according to claim 1, wherein an end portion of the stator has an enlarged portion configured to prevent the rotor from falling off and fix the stator to the pivoting member or the supporting member.

4. The stage light fixture according to claim 1, wherein an end portion of the stator has an end cover configured to prevent the rotor from falling off.

5. The stage light fixture according to claim 1, wherein the stator and the rotor are connected by at least one bearing.

6. The stage light fixture according to claim 5, wherein an inner side of the rotor has a protruding portion, two bearings are provided and respectively located at upper and lower ends of the protruding portion, and an outer ring of each of the two bearings abuts against the protruding portion.

7. The stage light fixture according to claim 1, wherein the stator is provided with a penetrating hole along a center of rotation of the pivoting member.

8. The stage light fixture according to claim 1, wherein the pivoting member comprises a light head of the stage light fixture, and the supporting member comprises a supporting arm of the stage light fixture, so that the light head is rotable around the supporting arm by the flat motor.

9. The stage light fixture according to claim 8, wherein two sides of the pivoting member are both pivoted to the supporting member, and each side is driven by a respective flat motor.

10. The stage light fixture according to claim 1, wherein the pivoting member comprises a light head of the stage light fixture and a supporting arm of the stage light fixture, and the supporting member comprises a light base of the stage light fixture, so that the light head and the support arm is rotable around the light base by the flat motor.

11. The stage light fixture according to claim 1, wherein at least one of a light beam shading component, a pattern reshaping component, a color rendering component, a focusing lens component, a light splitting component, a frosting component and a magnifying lens component is provided in the pivoting member.

* * * * *